United States Patent
Sung et al.

(10) Patent No.: US 11,252,724 B2
(45) Date of Patent: Feb. 15, 2022

(54) ELECTRONIC DEVICE FOR TRANSMITTING OR RECEIVING DATA IN WIRELESS COMMUNICATION SYSTEM AND METHOD THEREFOR

(71) Applicant: Samsung Electronics Co., Ltd., Suwon-si (KR)

(72) Inventors: Jinmo Sung, Suwon-si (KR); Moongyo Bae, Suwon-si (KR); Joonyoung Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 4 days.

(21) Appl. No.: 15/733,160

(22) PCT Filed: Nov. 30, 2018

(86) PCT No.: PCT/KR2018/015041
§ 371 (c)(1),
(2) Date: Jun. 1, 2020

(87) PCT Pub. No.: WO2019/108001
PCT Pub. Date: Jun. 6, 2019

(65) Prior Publication Data
US 2020/0367240 A1 Nov. 19, 2020

(30) Foreign Application Priority Data
Dec. 1, 2017 (KR) .................. 10-2017-0164601

(51) Int. Cl.
*H04W 72/04* (2009.01)
*H04W 88/06* (2009.01)

(52) U.S. Cl.
CPC ....... *H04W 72/0453* (2013.01); *H04W 88/06* (2013.01)

(58) Field of Classification Search
CPC ............ H04W 72/0453; H04W 88/06; H04W 52/028; H04W 36/0069; H04W 48/18; Y02D 30/70
See application file for complete search history.

(56) References Cited

U.S. PATENT DOCUMENTS

2015/0181530 A1 6/2015 Lee et al.
2017/0055187 A1 2/2017 Kang et al.
(Continued)

FOREIGN PATENT DOCUMENTS

KR 10-2009-0080323 A 7/2009
KR 10-2013-0027091 A 3/2013
(Continued)

OTHER PUBLICATIONS

International Search Report and Written Opinion of the International Searching Authority in connection with International Application No. PCT/KR2018/015041 dated Feb. 22, 2019, 13 pages.

*Primary Examiner* — Julio R Perez

(57) ABSTRACT

Various embodiments provide a communication method for an electronic device comprising a processor, a first modem for a first communication network, and a second modem for a second communication network, the communication method comprising the steps of: determining to operate in a second modem-dedicated mode for communication with the second communication network without being linked to the first modem, in an interworking mode for communication with the second communication network by linking the second modem and the first modem; turning off the first modem and rebooting the second modem; and setting a data path between the rebooted second modem and the processor. In addition, various other embodiments are possible.

13 Claims, 7 Drawing Sheets

(56) References Cited

U.S. PATENT DOCUMENTS

2019/0140974 A1* 5/2019 Sung .................. H04W 28/08
2020/0367240 A1* 11/2020 Sung ................ H04W 36/0069

FOREIGN PATENT DOCUMENTS

| KR | 10-2015-0073663 A | 7/2015 |
| WO | 2017034230 A1 | 3/2017 |
| WO | 2017204539 A1 | 11/2017 |

* cited by examiner

ELECTRONIC DEVICE FOR TRANSMITTING OR RECEIVING DATA IN WIRELESS COMMUNICATION SYSTEM AND METHOD THEREFOR

CROSS-REFERENCE TO RELATED APPLICATIONS

This application is a National Phase Entry of PCT International Application No. PCT/KR2018/015041, which was filed on Nov. 30, 2018 and claims priority to Korean Patent Application No. 10-2017-0164601, which was filed on Dec. 1, 2017, the contents of which are incorporated herein by reference.

BACKGROUND

1. Field

Various embodiments of the disclosure relate to electronic devices transmitting or receiving data in a wireless communication system.

2. Description of the Related Art

5th generation (5G) communication technology, as post-4th generation (4G) communication, is recently underway for research. 5G communication technology targets covering soaring data traffic, which amounts to 2,100 times more than long term evolution (LTE) which is a kind of 4G communication technology, drastically increased per-user transmission rate up to 1 Gbps of average transmission rate, handling many more electronic devices connected, low end-to-end latency, and high energy efficiency. By using a high-frequency band of, e.g., 28 GHz, 5G enables transmission/reception in a higher frequency band than 4G.

For standardization of 5G network systems, two modes, standalone (SA) mode and non-standalone (NSA) mode, are under discussion. The SA mode may be a scheme in which a 5G network independently communicates with UEs supporting 5G network communication.

The NSA mode may be a scheme operated as an auxiliary system of a legacy network (e.g., a 3G or 4G network) without independent operation of a 5G network. The NSA mode may include an interworking scheme between 4G/5G networks which are not in the standard NSA mode.

According to an embodiment, the interworking scheme may transfer control plane data (hereinafter, "control data") via the 4G network and user plane data (hereinafter, "user data") via the 5G network.

SUMMARY

According to various embodiments, there may be provided a method and device for an electronic device using a first modem and a second modem to switch from a first operation mode (hereinafter, simply referred to as a "first mode") to a second operation mode (hereinafter, simply referred to as a "second mode").

According to various embodiments, there is provided an electronic device and method for reducing power consumption on the electronic device by deactivating entities in the electronic device, which are not used in a first mode when the electronic device using the first mode and a second modem switches from the first mode to the second mode.

According to various embodiments, there is provided a method and device for establishing a data path between a processor and modems in an electronic device using a first modem and a second modem when the electronic device switches from the first mode to the second mode.

According to various embodiments, there is provided a method and device for processing functions not required for operation of a modem operated in a second mode when an electronic device using a first mode and the second mode switches from the first mode to the second mode.

According to various embodiments, the first mode may be an NSA mode, and the second mode may be an SA mode.

According to various embodiments of the disclosure, an electronic device comprises a first modem configured to provide first wireless communication in a first frequency band, a second modem configured to provide second wireless communication in a second frequency band higher than the first frequency band and exchange control information with the first modem, a processor operatively connected with the first modem and the second modem, and a memory operatively connected with the processor, wherein the memory stores instructions configured to, when executed enable the processor to: in a first operation, provide a radio interface layer (RIL) configured to establish a first data path with the first modem and a second data path with the second modem, control the RIL to directly exchange a first control signal associated with the first modem with the first modem, and control the RIL to exchange a second control signal associated with the second modem with the second modem, via the first modem, and, in a second operation, control the RIL to establish the second data path with the second modem but not the first data path with the first modem and control the RIL to directly exchange the control signal associated with the second modem with the second modem.

According to various embodiments of the disclosure, a method of communication by an electronic device including a first modem for a first communication network and a second modem for a second communication network comprises determining to switch to a second modem-dedicated mode for communication with the second communication network without interworking with the first modem in an interworking mode in which the second modem and the first modem interwork to communicate with the second communication network, turning off the first modem and rebooting the second modem, and establishing a data path between the rebooted second modem and the processor.

According to various embodiments of the disclosure, an electronic device comprises a processor, a first modem for communication with a first communication network, and a second modem for communication with a second communication network, wherein the processor is configured to determine to switch to a second modem-dedicated mode to communicate with the second communication network without interworking with the first modem, turn off the first modem, reboot the second modem, and establish a data path between the rebooted second modem and the processor in an interworking mode in which the second modem and the first modem interwork to communicate with the second communication network.

According to various embodiments of the disclosure, when an electronic device using a processor, a first modem, and a second modem switches from a first operation mode to a second operation mode, the first modem not required in the second operation mode may be turned off, the second modem may be initialized, and a data path and/or control path may be reestablished between the initialized second modem and the processor.

According to various embodiments of the disclosure, a first operation mode and a second operation mode may be supported in a single electronic device including a 4G modem and a 5G modem.

According to various embodiments of the disclosure, when an electronic device using a processor, a first modem, and a second modem switches from a first operation mode to a second operation mode, functions not required in the second modem may be deactivated, thereby reducing power consumption of the electronic device while increasing use efficiency of the electronic device.

DETAILED DESCRIPTION

Figure 1:
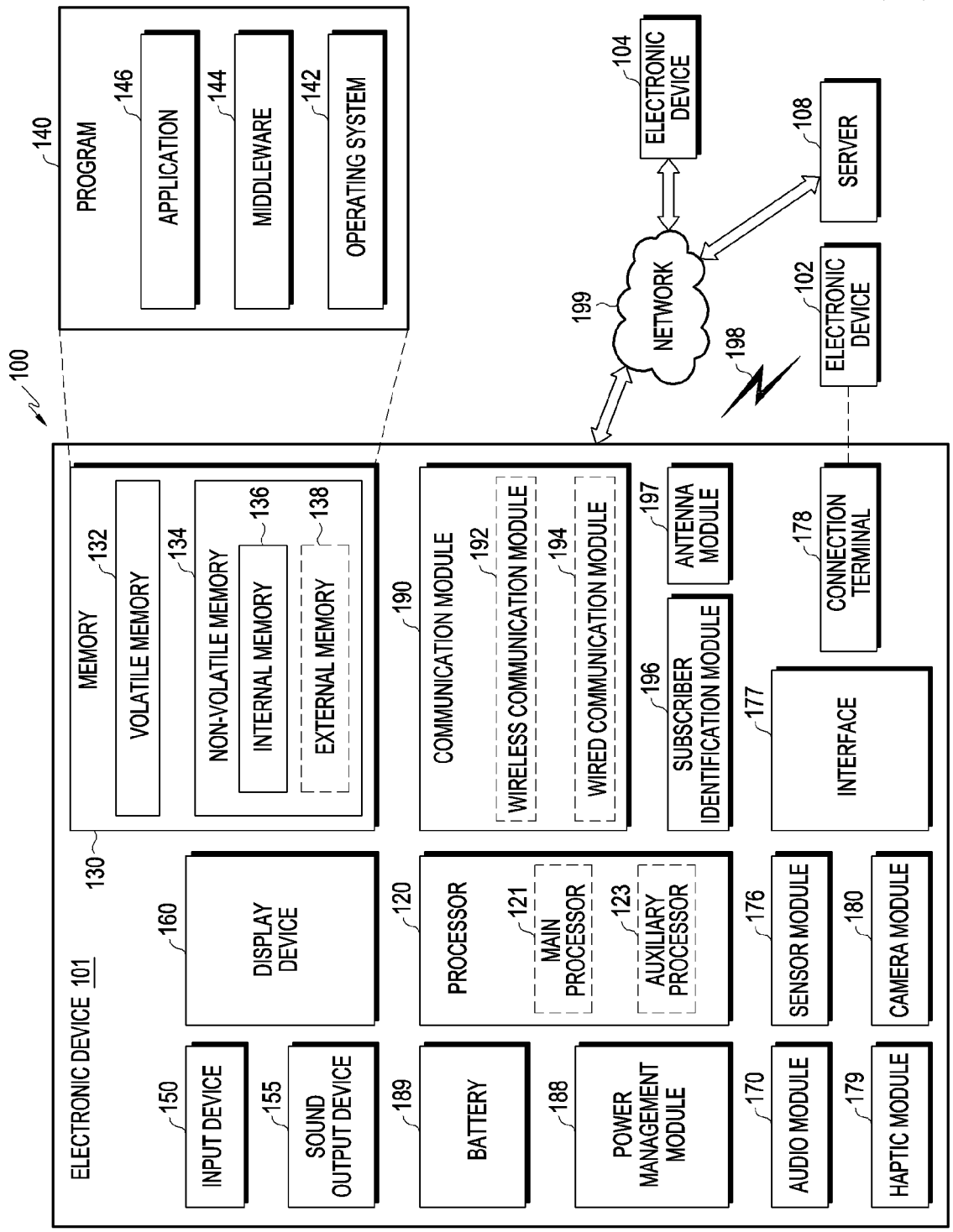
FIG. 1 is a block diagram illustrating an electronic device 101 in a network environment 100 according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. In some embodiments, the electronic device 101 may exclude at least one (e.g., the display device 160 or the camera module 180) of the components or add other components. In some embodiments, some components may be implemented to be integrated together, e.g., as if the sensor module 176 (e.g., a fingerprint sensor, an iris sensor, or an illuminance sensor) is embedded in the display device (160) (e.g., a display).

The processor 120 may drive, e.g., software (e.g., a program 140) to control at least one other component (e.g., a hardware or software component) of the electronic device 101 connected with the processor 120 and may process or compute various data. The processor 120 may load and process a command or data received from another component (e.g., the sensor module 176 or the communication module 190) on a volatile memory 132, and the processor 120 may store resultant data in a non-volatile memory 134. According to an embodiment, the processor 120 may include a main processor 121 (e.g., a central processing unit (CPU) or an application processor), and additionally or alternatively, an auxiliary processor 123 (e.g., a graphics processing unit (GPU), an image signal processor, a sensor hub processor, or a communication processor) that is operated independently from the main processor 121 and that consumes less power than the main processor 121 or is specified for a designated function. Here, the auxiliary processor 123 may be operated separately from or embedded in the main processor 121.

In such case, the auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., performing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or sensor module 176) of the electronic device 101, e.g., software (e.g., the program 140) and input data or output data for a command related to the software. The memory 130 may include the volatile memory 132 or the non-volatile memory 134.

The program 140, as software stored in the memory 130, may include, e.g., an operating system (OS) 142, middleware 144, or an application 146.

The input device 150 may be a device for receiving a command or data, which is to be used for a component (e.g., the processor 120) of the electronic device 101, from an outside (e.g., a user) of the electronic device 101. The input device 1150 may include, e.g., a microphone, a mouse, or a keyboard.

The sound output device 155 may be a device for outputting sound signals to the outside of the electronic device 101. The sound output device 1155 may include, e.g., a speaker which is used for general purposes, such as playing multimedia or recording and playing, and a receiver used for call receiving purposes only. According to an embodiment, the receiver may be formed integrally or separately from the speaker.

The display 160 may be a device for visually providing information to a user of the electronic device 101. The display device 2660 may include, e.g., a display, a hologram device, or a projector and a control circuit for controlling the display, hologram device, or projector. According to an embodiment, the display device 160 may include touch circuitry or a pressure sensor capable of measuring the strength of a pressure for a touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone) wiredly or wirelessly connected with the electronic device 101.

The sensor module 176 may generate an electrical signal or data value corresponding to an internal operating state (e.g., power or temperature) or external environmental state of the electronic device 101. The sensor module 176 may include, e.g., a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 177 may support a designated protocol enabling a wired or wireless connection with an external electronic device (e.g., the electronic device 102). According to an embodiment, the interface 177 may include a high definition multimedia interface (HDMI), a universal serial bus (USB) interface, a secure digital (SD) card interface, or an audio interface.

A connecting terminal 178 may include a connector, e.g., a HDMI connector, a USB connector, an SD card connector, or an audio connector (e.g., a headphone connector), which is able to physically connect the electronic device 101 with an external electronic device (e.g., the electronic device 102).

The haptic module 179 may convert an electrical signal into a mechanical stimulus (e.g., a vibration or motion) or electrical stimulus which may be recognized by a user via his tactile sensation or kinesthetic sensation. The haptic module 179 may include, e.g., a motor, a piezoelectric element, or an electric stimulator.

The camera module 180 may capture a still image or moving images. According to an embodiment, the camera module 180 may include one or more lenses, an image sensor, an image signal processor, or a flash.

The power management module 188 may be a module for managing power supplied to the electronic device 101. The power management module 188 may be configured as at least part of, e.g., a power management integrated circuit (PMIC).

The battery 189 may be a device for supplying power to at least one component of the electronic device 101. The battery 189 may include, e.g., a primary cell which is not rechargeable, a secondary cell which is rechargeable, or a fuel cell.

The communication module 190 may support establishing a wired or wireless communication channel between the electronic device 101 and an external electronic device (e.g., the electronic device 102, the electronic device 104, or the server 108) and performing communication through the established communication channel. The communication module 190 may include one or more communication processors that are operated independently from the processor 120 (e.g., an application processor) and supports wired or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of the wireless communication module 192 and the wired communication module 194 may be used to communicate with an external electronic device through a first network 198 (e.g., a short-range communication network, such as Bluetooth, wireless-fidelity (Wi-Fi) direct, or infrared data association (IrDA)) or a second network 199 (e.g., a long-range communication network, such as a cellular network, the Internet, or a communication network (e.g., LAN or wide area network (WAN)). The above-enumerated types of communication modules 190 may be implemented in a single chip or individually in separate chips.

According to an embodiment, the wireless communication module 192 may differentiate and authenticate the electronic device 101 in the communication network using user information stored in the subscriber identification module 196.

The antenna module 197 may include one or more antennas for transmitting or receiving a signal or power to/from an outside. According to an embodiment, the communication module 190 (e.g., the wireless communication module 192) may transmit or receive a signal to/from an external electronic device through an antenna appropriate for a communication scheme.

Some of the above-described components may be connected together through an inter-peripheral communication scheme (e.g., a bus, general purpose input/output (GPIO), serial peripheral interface (SPI), or mobile industry processor interface (MIPI)), communicating signals (e.g., commands or data) therebetween.

According to an embodiment, instructions or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations executed on the electronic device 101 may be run on one or more other external electronic devices. According to an embodiment, when the electronic device 101 should perform a certain function or service automatically or at a request, the electronic device 101, instead of, or in addition to, executing the function or service on its own, may request an external electronic device to perform at least some functions associated therewith. The external electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technology may be used, for example.

The electronic device according to various embodiments may be one of various types of electronic devices. The electronic devices may include at least one of, e.g., a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the techniques set forth herein to particular embodiments and that various changes, equivalents, and/or replacements therefor also fall within the scope of the disclosure. The same or similar reference denotations may be used to refer to the same or similar elements throughout the specification and the drawings. It is to be understood that the singular forms "a," "an," and "the" include plural references unless the context clearly dictates otherwise. As used herein, the term "A or B," "at least one of A and/or B," "A, B, or C," or "at least one of A, B, and/or C" may include all possible combinations of the enumerated items. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the term "module" includes a unit configured in hardware, software, or firmware and may interchangeably be used with other terms, e.g., "logic," "logic block," "part," or "circuit." A module may be a single integral part or a minimum unit or part for performing one or more functions. For example, the module may be configured in an application-specific integrated circuit (ASIC).

Various embodiments as set forth herein may be implemented as software (e.g., the program 140) containing commands that are stored in a machine (e.g., computer)-readable storage medium (e.g., an internal memory 136) or an external memory 138. The machine may be a device that may invoke a command stored in the storage medium and may be operated as per the invoked command. The machine may include an electronic device (e.g., the electronic device 101) according to embodiments disclosed herein. When the command is executed by a processor (e.g., the processor 120), the processor may perform a function corresponding to the command on its own or using other components under the control of the processor. The command may contain a code that is generated or executed by a compiler or an interpreter. The machine-readable storage medium may be provided in the form of a non-transitory storage medium. Here, the term "non-transitory" simply means that the storage medium does not include a signal and is tangible, but this term does not differentiate between where data is semipermanently stored in the storage medium and where data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., Playstore™). When distributed online, at least part of the computer program product may be temporarily generated or at least temporarily stored in a storage medium, such as the manufacturer's server, a server of the application store, or a relay server.

According to various embodiments, each component (e.g., a module or program) may be configured of a single or multiple entities, and the various embodiments may exclude some of the above-described sub components or add other sub components. Alternatively or additionally, some components (e.g., modules or programs) may be integrated into a single entity that may then perform the respective (preintegration) functions of the components in the same or similar manner. According to various embodiments, operations performed by modules, programs, or other components may be carried out sequentially, in parallel, repeatedly, or heuristically, or at least some operations may be executed in a different order or omitted, or other operations may be added.

Before describing various embodiments of the disclosure, a network environment to which an embodiment of the disclosure may apply is described. Various embodiments disclosed herein may be applicable to data services supporting 5G network communication. However, in some cases, the embodiments may not apply to the IP multimedia systems (IMSs), such as voice over LTE (VoLTE).

Figure 2:
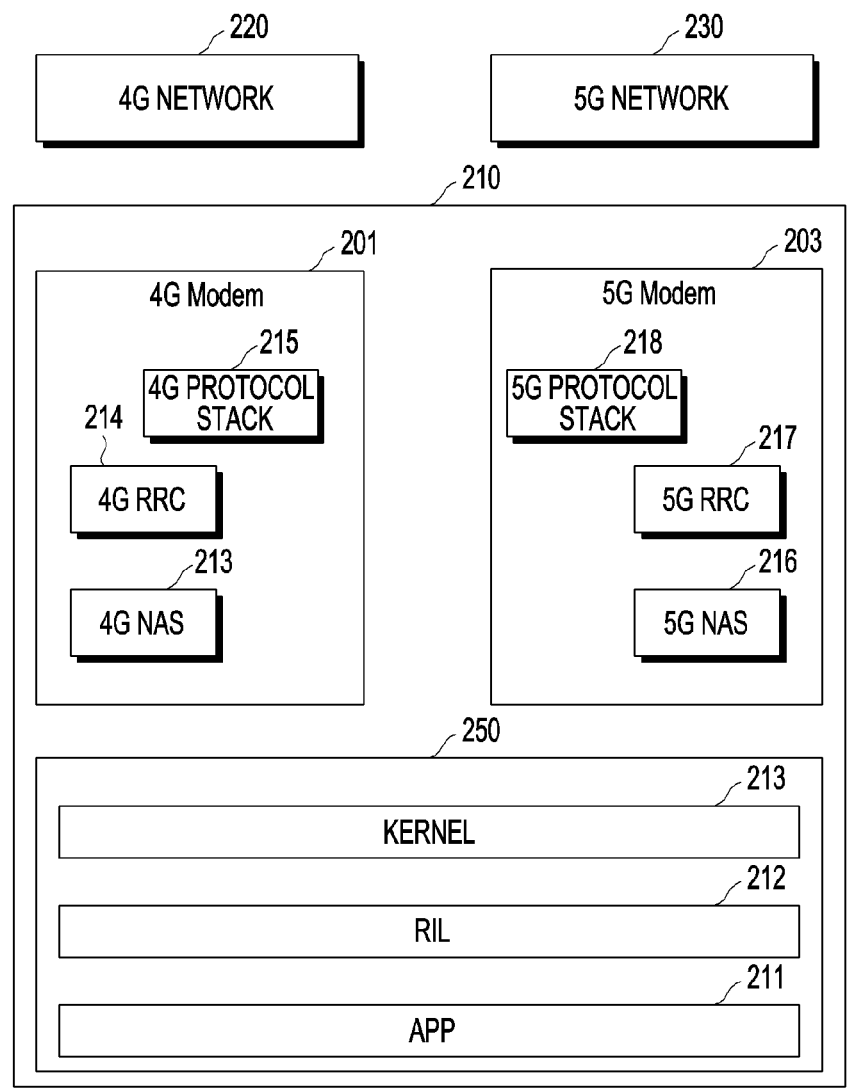
FIG. 2 is a view illustrating an electronic device 210 and network entities according to various embodiments of the disclosure.

FIG. 2 is a view illustrating an electronic device 210 and network entities according to various embodiments of the disclosure.

Referring to FIG. 2, according to various embodiments, an electronic device 210 may support communication with a 4G network 220, which is a first network, and a 5G network 230, which is a second network. In the following embodiments, the electronic device 210 may refer to the electronic device 101 of FIG. 1.

According to various embodiments, the 4G network 220 and the 5G network 230 may interwork with each other. According to various embodiments, the 4G network 220 and/or 5G network 230 each may include independent radio access networks (RANs) and/or an independent core network and independently operate authentication-related equipment.

According to various embodiments, as defined in the 3rd generation partnership project (3GPP) standards, the 4G network 220 may include a 4G core and 4G eNBs. According to various embodiments, as defined in the 3GPP standards, the 5G network 230 may include a 5G core (not shown) and 5G new radio (NR) (not shown).

According to various embodiments, the 4G core may include a mobility management entity (MME) (not shown) that manages 4G communication standard-based network mobility and/or generates an evolved packet system (EPS) bearer and/or a home subscriber server (HSS) (not shown) that stores authentication information of the electronic device 210 and transfers the authentication information to the MME.

According to various embodiments, the 4G eNB may be a base station supporting the 4G network. The 4G eNB may provide wireless connection between the electronic device 210 and the 4G network 220. The 4G eNB may be configured according to the 4G standards. For example, the 4G eNB may support the radio resource control (RRC), packet data convergence protocol (PDCP), radio link control (RLC), and medium access control (MAC) layer. According to various embodiments, the eNB may also support the physical (PHY) layer. eNB may be replaced with other various terms, such as base station, NB, or node.

According to various embodiments, the eNB may provide wireless connection between the electronic device 210 and the 4G network 220. The eNB configures a cell and may provide 4G network communication services to the electronic devices in the cell.

According to various embodiments the 5G core may include at least one entity that performs the same or similar functions to the 4G core. According to various embodiments, the 5G core may include an entity (not shown) capable of functioning as a gateway (GW) to support interworking between the 4G network 220 and the 5G network 230. The electronic device 210 may access the GW to transmit/receive data.

According to various embodiments, the 5G NR may perform the same or similar functions to the 4G eNB. According to various embodiments, the 5G NR may support the RRC, PDCP, RLC, MAC, and PHY layer.

According to various embodiments, the 5G NR may provide wireless connection between the electronic device 210 and the 5G network 230. The 5G NR may establish a cell and provide 5G network communication services to the electronic devices in the cell.

According to various embodiments, the electronic device 210 may be an electronic device supporting the 5G network 230 (hereinafter, "5G electronic device"). 5G electronic devices may include electronic devices supporting only 5G network communication and electronic devices supporting both 4G network communication and 5G network communication. The electronic device 210 disclosed herein may support both 4G network communication and 5G network communication. For example, according to an embodiment, the electronic device 210 may support a non-standalone (NSA) scheme via interworking between 4G and 5G. Or, according to an embodiment, the electronic device 210 may support operations in a 4G SA scheme or 5G SA scheme.

According to various embodiments, the electronic device 210 may include a first modem 201 and a second modem 203. According to various embodiments, the first modem 201 may be a modem for communicating with the 4G communication network 220, and the second modem 203 may be a modem for communicating with the 5G communication network 230. The first modem 201 and the second modem 203, respectively, may include NAS entities 213 and 216, RRC entities 214 and 217, and protocol stacks 215 and 218 for their respective corresponding communication networks. Each of the NAS entities 213 and 216 and the RRC entities 214 and 217 may basically process control data related to the corresponding communication network. Further, each of the protocol stacks 215 and 218 may support a PDCP layer, an RLC layer, or an MAC layer.

According to various embodiments, the electronic device 210 may wirelessly access the 4G eNB via the 4G modem 201 and transmit/receive packets via the 4G core. The electronic device 210 may wirelessly access the 5G NR via the 5G modem 203 and transmit/receive packets via the 5G core.

According to various embodiments, the electronic device 210 may transmit/receive 5G user data and/or 5G control data via the 5G network 230 and the 5G modem 203 without interworking with the 4G network. This operation scheme may be referred to as a "first operation mode," or simply as a "first mode." The first mode may also be referred to as a "5G SA mode," or simply as an "SA mode."

According to various embodiments, the electronic device 210 may transmit/receive 5G user data and/or 5G control data via interworking with the 4G network 220 and the 5G network 230. This operation scheme may be referred to as a "second operation mode," or simply as a "second mode." The second mode may be referred to as an "NSA mode." According to various embodiments, operations in the NSA mode are described with reference to FIG. 3, and operations in the SA mode are described with reference to FIG. 4.

According to various embodiments, when the electronic device 210 switches from the NSA mode to the SA mode, the 4G modem 201 may be terminated, and the 5G modem 203 may be rebooted. Further, the electronic device 210 may establish a data path and/or control path in the SA mode after the 5G modem 203 reboots. According to various embodiments, entities which have been used in the NSA mode but not in the SA mode may be deactivated, reducing the power consumption of the electronic device 210.

According to various embodiments, the electronic device 210 may run an application and select a data transmission/reception path with the 4G 220 or 5G network 230 to transmit/receive application-related data via the 4G network 220 or 5G network 230.

According to various embodiments, the electronic device 210 may support 4G standards and/or 5G standards. For example, the electronic device 210 may support the RRC, PDCP, RLC, MAC, and PHY layer. Further, according to various embodiments, a radio bearer may be established to provide a data transmission service between the electronic device 210 and the network. According to an embodiment, the RRC layer may perform functions related to establishing, reestablishing, or releasing a radio bearer. The RRC layer may manage transmission/reception of paging messages or transfer system information to the electronic device 210 in the cell. The RRC layer may perform wireless connection and mobility management.

According to various embodiments, the non-access stratum (NAS) layers 213 and 216 of the electronic device 210 may perform functions such as session management and/or mobility management. The NAS layer may perform functions such as default bearer management and dedicated bearer management.

According to various embodiments, the protocol stack 215 or 218 of the electronic device 210 may include a PDCP layer, an RLC layer, and an MAC layer.

According to various embodiments, the PDCP layer may compress IP data packets and cipher control data and/or user data. The PDCP layer may protect data integrity or prevent data loss during handover.

According to various embodiments, the radio link control (RLC) layer may resize the packet transferred from the PDCP layer and transfer to the MAC layer. According to various embodiments, the MAC layer may perform, e.g., inter-channel multiplexing and uplink/downlink scheduling.

According to various embodiments, the electronic device 210 may include a 4G modem 201, a 5G modem 203, and a processor 250. In the electronic device 210 supporting the standalone (SA) scheme, the 4G modem 201 and the 5G modem 203 may be connected with the processor 250. According to various embodiments of the disclosure, the electronic device 210 may operate in the NSA mode or SA mode to perform 5G communication.

According to various embodiments, the electronic device 210 may operate in a non-standalone (NSA)-based scheme. The processor 250 (or, e.g., a RIL 212 in the processor 250) may recognize the 4G modem 201 and 5G modem 203 as a single modem, perform switching of a data path in the 4G modem 201 or 5G modem 203, and notify the processor 250 of this.

According to various embodiments, the electronic device 210 may operate in a standalone (SA)-based scheme. The processor 250 (or, the RIL 212 in the processor 250) may separately recognize the 4G modem 201 or 5G modem 203 and may directly receive data via only the 4G modem 201 or 5G modem 203.

According to various embodiments, the electronic device 210 may operate on some data using interworking between the 4G modem 201 and the 5G modem 203 while operating in the standalone (SA) scheme. For example, 5G user data may be directly received from the 5G network via the 5G modem 203, and 5G control data may be received from the 5G network via the 4G network and the 4G modem 201.

According to various embodiments, the electronic device 210 may operate while switching between the NSA mode and the 5G SA mode and, if the operation mode switches, the electronic device 210 may reestablish a user data and/or control data path.

Operations in the NSA mode may be described below with reference to FIG. 3, and operations in the 5G SA mode may be described below with reference to FIG. 4. Operations of the electronic device 210 upon switching from the NSA mode to the 5G SA mode may be described below with reference to FIG. 6. Although embodiments of the disclosure in which the electronic device 210 includes two modems are described herein, various embodiments of the disclosure may also apply even where the electronic device 210 includes two or more modems.

According to various embodiments, the electronic device 210 may include an application 211, a radio interface layer (RIL) 212, and a kernel 213. According to various embodiments, the application 211 may be the same as the application 146 of FIG. 1, and the RIL 212 may be included in the middleware 144 of FIG. 1, and the kernel 213 may be included in the operating system 142. According to various embodiments, the middleware 144 and the application 146 may be included in the application layer (e.g., the application layer 730 of FIG. 7). For example, the application 211 and/or the RIL 212 may be included in the application layer. According to an embodiment, the application 211, RIL 212, and kernel 213 may be implemented in software. According to an embodiment, the processor 250 may perform executions related to instructions or commands of the application 211, RIL 212, and kernel 213. According to various embodiments, operations performed by the application 211, RIL 212, and kernel 213 may be appreciated as operations performed by the processor (e.g., the processor 120 of FIG. 1).

According to various embodiments, the application 211 may function to provide various services (e.g., IMS services or Internet services) provided from the network to the user. The RIL 212 may provide a wireless communication-related interface between the application layer and the modem. For example, the RIL 212 may include a protocol for communication between the processor 250 and the modem processor (e.g., the 4G modem 201 and 5G modem 203) (hereinafter, an inter-processor communication (IPC) protocol). For example, the application 211 of the application layer may transfer a communication-related request (e.g., a request for starting a call, sending a text message, or data access) to the 4G modem 201 or 5G modem 203 via the RIL 212. At this time, the RIL 212 may transfer the request to the corresponding modem using IPC control data appropriate for the request from the application 211.

According to various embodiments, the electronic device 210 may include an application processor (AP). The AP may be simply referred to as a processor 250. According to various embodiments, the processor 250 may execute commands from the kernel 213. According to various embodiments, the processor 250 may correspond to the processor 120 of FIG. 1.

Figure 3:
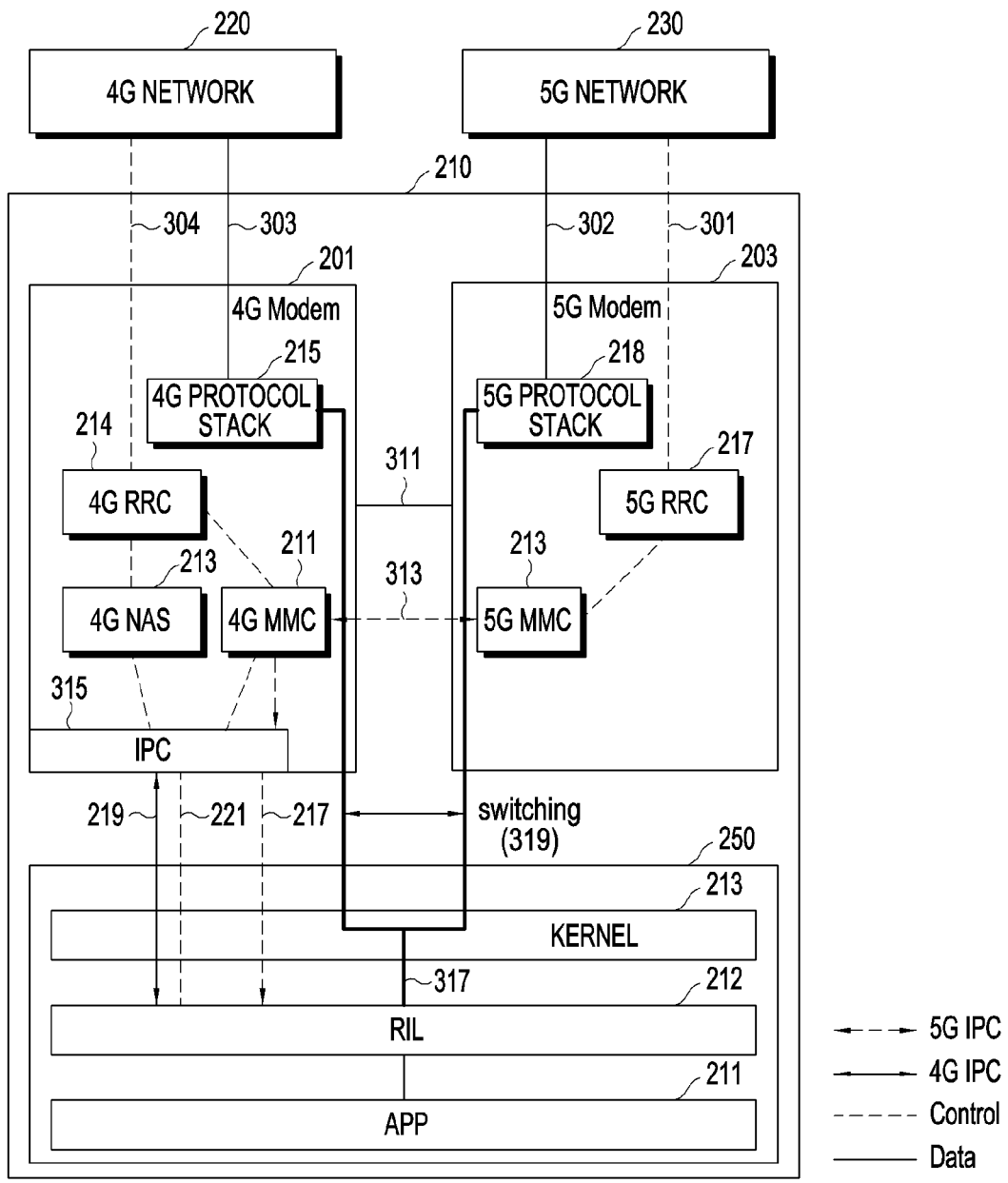
FIG. 3 is a view illustrating operations of an electronic device 210 in an NSA mode according to various embodiments.

FIG. 3 is a view illustrating operations of an electronic device 210 in an NSA mode according to various embodiments.

According to various embodiments, the electronic device 210 may include a 4G modem 201 supporting 4G network communication and a 5G modem 203 supporting 5G network communication. According to various embodiments, the 4G modem 201 may be disposed on the same system-on-chip (SoC) as the processor 250. According to various embodiments, the 4G modem 201 and/or 5G modem 203 may be operatively or communicatively coupled to the RIL 212.

According to various embodiments, the electronic device 210 may include an application 211, a radio interface layer (RIL) 212, and a kernel 213. The application 211, RIL 212, and kernel 213, respectively, may be the same or similar to the application 211, RIL 212, and kernel 213 of FIG. 2, and no duplicate description is given below.

According to various embodiments, the 4G modem 201 and 5G modem 203 may be operatively or communicatively coupled to the RIL 212.

According to an embodiment, the electronic device 210 may transfer 5G control data 301 received by the 5G modem 203 to the RIL 212 via the 4G modem 201 and 5G user data 302 received by the 5G modem 203 to the application 211 of the processor 250 via the 5G modem 203.

According to an embodiment, the electronic device 210 may transfer 5G control data 301 received by the 5G modem 203 to the 4G MMC 211 in the 4G modem 201 via the 5G RRC entity 217 and 5G MMC 213 in the 5G modem 203 and then to the RIL 212 of the processor 250 using the 4G IPC protocol 315. According to an embodiment, the electronic device 210 may transfer the 5G user data 302 received by the 5G modem 203 to the application 211 of the processor 250 via the 5G protocol stack 218 in the 5G modem 203. According to an embodiment, the processor 250 may transfer (transmit/receive) the 5G control message via a first physical interface (e.g., sharedmemory i/f) with the 4G modem 201 and transfer (transmit/receive) the 5G user data via a second physical interface (e.g., pcie i/f) (separated from the first physical interface), with the 5G modem 203.

According to various embodiments, the 4G user data 303 and/or control data 304 may be transferred via the 4G modem 201. According to an embodiment, the electronic device 210 may transfer the 4G control data 303 received by the 4G modem 201, via the 4G RRC entity 214 and 4G NAS entity 213 in the 4G modem 201 and using the IPC protocol 315 supported by the 4G modem 201, to the RIL 212 of the processor 250. According to an embodiment, the electronic device 210 may transfer the 4G user data 303 received by the 4G modem 201 to the application 211 of the processor 250 via the 4G protocol stack 215 in the 4G modem 201. According to an embodiment, the processor 250 may transfer (transmit/receive) the 4G control message and/or 4G user data, via the 4G modem 201 and the first physical interface (e.g., sharedmemory i/f), with the 4G modem 201.

According to various embodiments, to transfer the 5G control data, the 4G modem 201 and the 5G modem 203 may interwork with each other. For example, the 4G modem 201 and the 5G modem 203 may exchange information therebetween on a hardware interface 311.

According to various embodiments, the 4G modem 201 and 5G modem 203 in the electronic device 210 may interwork with each other. To that end, the 4G modem 201 and 5G modem 203 may be connected with each other via the hardware interface 311, and the modems 201 and 213, respectively, may include multi-mode controllers (MMCs) 211 and 213.

According to various embodiments, the 4G modem 201 and/or 5G modem 203 may connect a physical interface 311 (or hardware interface) to control interworking or communicate information therebetween. The 4G MMC 211 and/or 5G MMC 213 may be operated to process information obtained via the hardware interface or transfer information via the hardware interface.

For example, the hardware interface 311 may include at least one of a universal asynchronous receiver/transmitter (UART), high speed UART (HS-UART), inter-integrated circuit (I2C), or serial peripheral interface bus (SPI).

According to various embodiments, high speed universal asynchronous receiver/transmitter (HS-UART) communication may be performed between the 4G MMC 211 and the 5G MMC 213. The 4G MMC 211 and the 5G MMC 213 may exchange information for interworking using HS-UART communication. The 4G MMC 211 and/or 5G MMC 213 may be implemented in software or hardware.

According to various embodiments, for interworking between the 4G modem 201 and 5G modem 203, the 4G MMC 211 and 5G MMC 213 may exchange commands via HS-UART communication therebetween. IPC messages described below may be communicated while remaining in the IPC format.

According to an embodiment, commands communicated between the 4G modem 201 and 5G modem 203 may be as follows:

1) 5G Attach status notification: may indicate the 5G attach status.

2) 4G RRC status notification: may indicate the 4G RRC connection status.

3) Switching notification: may indicate the status of switching from 4G to 5G/switching from 5G to 4G.

According to various embodiments, the 4G MMC 211 and the 5G MMC 213 may communicate information therebetween (313). According to various embodiments, information communicated between the 4G MMC 211 and the 5G MMC 213 may be control data or information necessary for interworking, including RRC connection information, switching messages, or inter-processor communication (IPC). The IPC may be a communication protocol between the application processor 250 and the communication processor (CP) in the modem.

According to various embodiments, in the context where data communication is being performed via the 5G modem 203, a limited IPC message for data connection may be generated from the 5G MMC 213 and be transferred via the 4G MMC 211 and IPC 315 to the RIL 212.

Table 1 below shows examples of the IPC message. The IPC documents may be referenced for the specific format and usage.

TABLE 1

| IPC name | usage |
| --- | --- |
| Net Regi Notification | transfer network registration information |
| RSSI (received signal strength indication) Notification | transfer RSSI level |
| GPRS (general packet radio service) Notification | transfer data connection-related information |
| Switching Notification | transfer 4G-5G switching information |

According to various embodiments, to avoid collision between IPC messages while the IPC messages are transferred from the 5G modem 203 to the RIL 212, the 4G modem 201 may refrain from transferring the same IPC message to the RIL 212. According to various embodiments, other IPC messages than the IPC messages shown in Table 1 above may be generated and processed by the 4G modem 201. The 5G modem 203 may refrain from generating and receiving other IPC messages than the IPC messages shown in Table 1. According to various embodiments, messages associated with the 4G modem 201 may be generated and processed by the 4G modem 201, and messages associated with the 5G modem 203 may be generated and processed by the 5G modem 203.

According to various embodiments, for interworking between heterogeneous networks, interworking between 4G and 5G network communication may be described. However, the kind of network is not limited to a specific one, and the following embodiments may apply to interworking between various kinds of heterogeneous network communication. For example, the following embodiments may be applied to interworking between 3G and 4G network communication.

According to various embodiments, the electronic device 210 (e.g., the processor 250) may transfer data related to the application 211 to the 4G modem 201 or 5G modem 203 via one RIL 212.

According to an embodiment, the RIL 212 may determine whether to switch (319) between the 4G network and 5G network connected with the electronic device 210. According to an embodiment, the RIL 212 may receive switching request information from the 4G modem 201 or 5G modem 203 or may determine whether to switch networks in response to a user input.

According to various embodiments, the 4G modem 201 may update the RRC connection status to the 4G MMC 211. According to various embodiments, the 4G modem 201 may update the RRC connection status whenever the RRC connection status varies. The 4G MMC 211 may generate and/or transfer a 4G RRC status notification to the 5G MMC 213 periodically or whenever the RRC connection status information is updated.

According to various embodiments, the 5G modem 203 may update the 5G attach status and/or 5G RRC connection status. The 5G modem 203 may perform update to the 5G MMC 213 whenever the 5G attach status and/or 5G RRC connection status varies. According to various embodiments, the 5G modem 203 may update the result of 5G radio measurement. The 5G modem 203 may update the result of 5G radio measurement, and the 5G MMC 213 may check switching conditions.

According to various embodiments, the electronic device 210 supporting 5G communication may be a single RIL (212)-based device corresponding to both the 4G modem 201 and the 5G modem 203.

According to various embodiments, in the context of the data path switching from 4G to 5G, the 5G MMC 213 may perform control operations. According to various embodiments, the 5G MMC 213 may trigger a service request (SR) to the 5G modem 203 and start 5G data connection. If the SR is triggered, and the data radio bearer (DRB) is opened so that the data connection is complete, the 5G modem 203 may transfer an SR completed notification message to the 5G MMC 213. The 5G MMC 213 may perform the switching operation in response to the SR completed notification message.

According to various embodiments, the 5G MMC 213 and 4G MMC 211 may control the data path of the 4G modem 201 or 5G modem 203. The 5G MMC 213 and 4G MMC 211 may generate a switching message and switch the data path in the electronic device 210 using the switching message. According to various embodiments, the electronic device 210 may transmit/receive user data, e.g., application (211)-related data via a 4G internet public data network (PDN). A request for mobile orientation (MO) or mobile termination (MT) from the electronic device 210 may be made via the 4G internet PDN.

According to various embodiments, the electronic device 210 may operate based on one RIL 212 on the 4G modem 201 and 5G modem 203. According to various embodiments, the 4G modem 201 and 5G modem 203 may share at least part of the data path. For example, the 4G modem 201 and 5G modem 203 may share the data path 317 of at least part in the processor 250 (e.g., the kernel 213). For example, data of the 4G modem 201 and 5G modem 203 may be merged or switched in the kernel 213, establishing a data path to the application 211. According to another embodiment, by the application 211, a 4G user data path to the 4G modem 201 and a 5G user data path to the 5G modem 203 may be formed as (two) separate data paths.

According to various embodiments, the electronic device 210 may transmit or receive data to/from the network via the 4G modem 201 or 5G modem 203. The electronic device 210 may transmit or receive data selectively using the 4G modem 201 or 5G modem 203. The electronic device 210 may selectively use the 4G data path or 5G data path.

According to various embodiments, the electronic device 210 may receive control data associated with the 5G modem 203 from the 5G modem 203 for switching between the 4G data path and 5G data path. In this case, the control data may be transferred via a control path in the electronic device 210. According to various embodiments, the control data associated with the 5G modem 203 may include at least one of the 5G network status, the status (e.g., on/off) of the 5G modem 203, or the 5G network attach status.

According to various embodiments, the electronic device 210 may obtain control data associated with the 4G modem 201 from the 4G modem 201 via the 4G control path 221. The control data associated with the 4G modem 201 may include at least one of the 4G network status, 4G network attach status, or the status of the 4G modem 201.

According to various embodiments, as the control path, there may be a 4G control path 221 for transferring control data associated with the 4G modem 201 and/or a 5G control path 221 for transferring control data associated with the 5G modem 203. According to various embodiments, the 4G control path may be a path 221 formed between the inter-processor communication (IPC) 315 and the RIL 212. The 5G control path may be a path 217 formed between the IPC 315 and the RIL 212.

According to an embodiment, one control path may be established between the RIL 212 and modems. In other words, one of the above-described 4G control path 221 and 5G control path 217 may be shared between the RIL 212 and the 4G modem 201.

According to various embodiments, the 4G IPC path between the 4G modem 201 and the RIL 212 may include a physical channel 219. Meanwhile, the 5G IPC path 217 between the 4G modem 201 and the RIL 212 may be formed via the 4G IPC path 221 and/or the physical channel 219. For example, 5G control data may be transferred to the RIL 212 via the 4G control path 221 and/or physical channel 219. For example, the 4G modem 201 may transfer the 5G control data received from the 5G modem 203 to the RIL 212 via the 4G control path 221 and/or physical channel 219.

According to various embodiments, the RIL 212 may recognize the 5G control information (i.e., 5G IPC message) and 4G control data (i.e., 4G IPC message) as information for the same logical channel (not shown). Although FIG. 3 illustrates that the 4G IPC path 221 and the 5G IPC path 217 are separated from each other, they may indeed be a single logical channel (not shown). Thus, the RIL 212 may process the 5G control data and 4G control data without distinguishing them.

Figure 4:
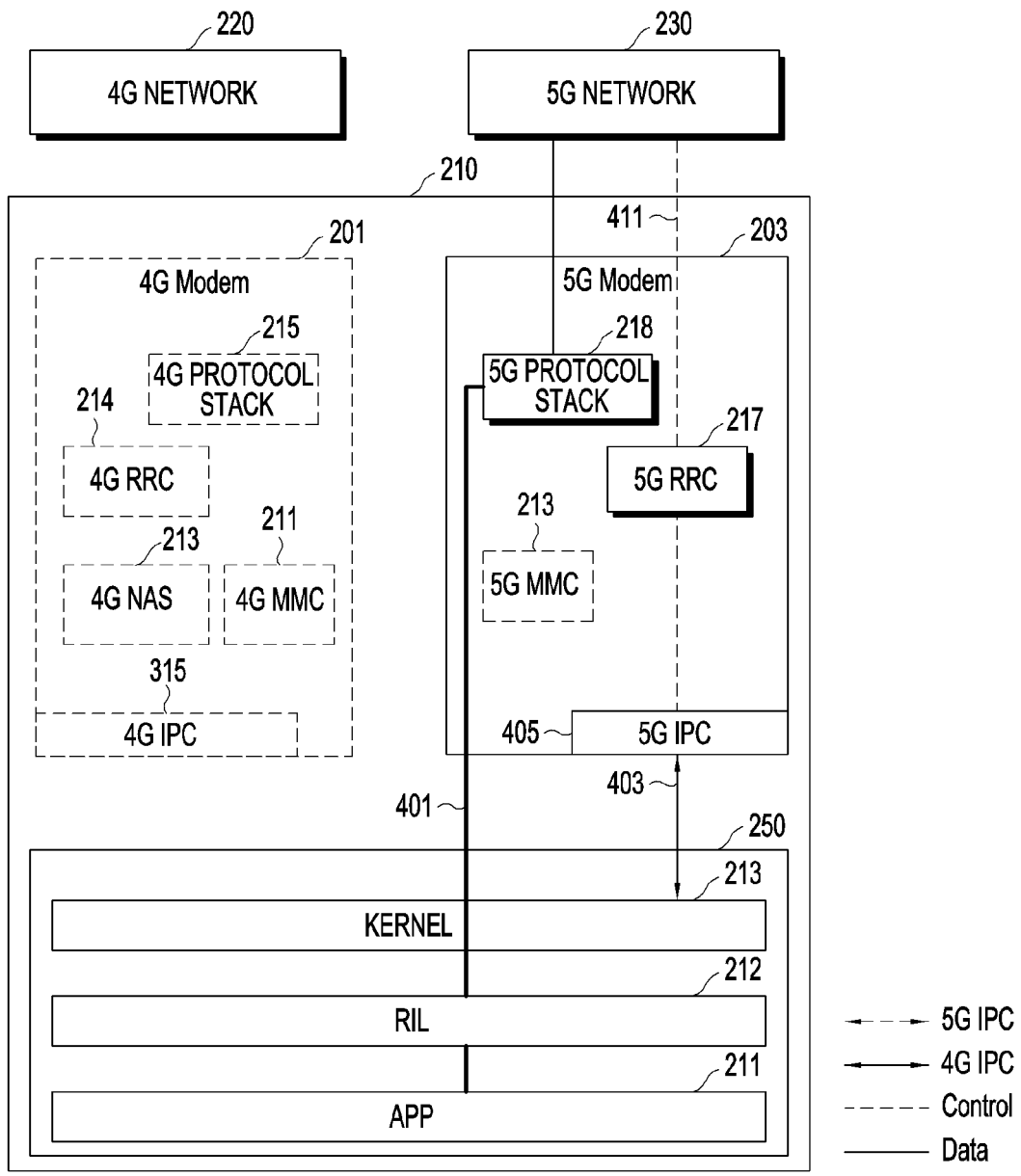
FIG. 4 is a view illustrating operations of an electronic device 210 in a 5G SA mode according to various embodiments.

FIG. 4 is a view illustrating operations of an electronic device 210 in a 5G SA mode according to various embodiments.

According to various embodiments, when the electronic device 210 operates in the 5G SA mode, the 4G modem 201 may be terminated or deactivated. In FIG. 3, the 4G modem 201 is shown in dashed lines which may indicate that the 4G modem 201 is deactivated. Deactivation may mean that the software (e.g., processor 250 and/or operating system) operated on the processor 250 of the modem 201 is deactivated from running. According to various embodiments, the deactivation may refer to the status in which the supply of power to the modem 201 is reduced or cut off. According to various embodiments, the electronic device 210 may directly transfer data related to the application 211 to the 5G modem 203 via one RIL 212. The 5G modem 203 may be operatively or communicatively coupled to the RIL 212.

According to various embodiments, the user data received by the electronic device 210 from the 5G network 230 may be transferred to the application 211 via the 5G modem 203 and the data path. According to various embodiments, the user data received by the electronic device 210 from the 5G network 230 may be transferred to the application 211 via the 5G protocol stack 218 in the 5G modem 203 and the data path 401. According to various embodiments, the user data related to the application 211 may be transmitted to the 5G network 230 via the data path 401.

According to various embodiments, the electronic device 210 may transmit or receive user data and/or control data to/from the 5G network 230 using the 5G modem 203.

According to various embodiments, the electronic device 210 may receive control data associated with the 5G modem 203 via the 5G modem 203. In this case, the control data may be transferred via a control path 403 in the electronic device 210. The control path 403 is a path established for transfer of control information, e.g., IPC message, between the 5G modem 203 and the RIL 212 in the processor 250. According to various embodiments, the 5G modem may support an IPC protocol 405. According to various embodiments, the control data associated with the 5G modem 203 may include at least one of the 5G network status, the status (e.g., on/off) of the 5G modem 203, or the 5G network attach status.

According to various embodiments, there may be a 5G control path for transferring control data associated with the 5G modem 203. According to various embodiments, the 5G control path may be a path 403 formed between the 5G IPC 303 and the RIL 212. According to an embodiment, in the NSA mode, the 5G control data may be transferred via the 5G MMC 213 and the 4G modem 201 to the RIL 212. However, in the 5G SA mode, control data may not pass through the 5G MMC 213 and, thus, the 5G MMC 213 may be deactivated.

According to various embodiments, the electronic device 210 may transmit/receive IPC messages via the 5G control path 403. According to various embodiments, the 5G IPC path 403 between the 5G modem 203 and the RIL 212 may be a physical channel.

Figure 5:
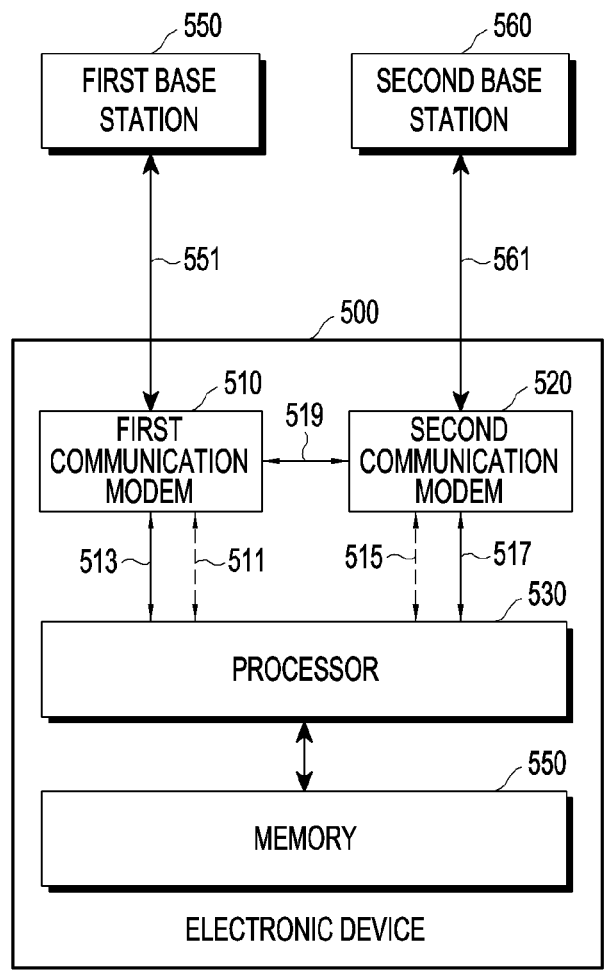
FIG. 5 is a block diagram illustrating a configuration of an electronic device 500 according to various embodiments.

FIG. 5 is a block diagram illustrating a configuration of an electronic device 500 according to various embodiments.

Referring to FIG. 5, an electronic device 500 may include a first communication modem 510, a second communication modem 520, a processor 530, and a memory 550. According to various embodiments, the electronic device 500 may be the same or similar to the electronic device 101 of FIG. 1 or the electronic device 210 of FIGS. 2 to 4. The processor 530 may correspond to the processor 120 of FIG. 1 or the processor 250 of FIGS. 2 to 4.

According to various embodiments, the electronic device 500 may support a first communication network 551 and/or a second communication network 561. The electronic device 500 may transmit or receive signals to/from a first base station 550 supporting the first communication network 551 via the first communication network 551 and transmit or receive signals to a second base station 560 supporting the second communication network 561 via the second communication network 561.

According to various embodiments, the first communication network 551 may transmit/receive signals with a different frequency from the second communication network 561. For example, the first communication network 551 may transmit/receive signals within a frequency band lower than the frequency band of the second communication network 561. The first communication network 551 and the second communication network 561 may transmit/receive signals in partially the same frequency band.

According to various embodiments, the first communication network 551 may transmit/receive signals in a first frequency band, and the second communication network 561 may transmit/receive signals in a second frequency band. For example, the first frequency band may have a frequency ranging from 211 MHz to 2,300 MHz. The second frequency band may have a range not less than 20 GHz.

According to various embodiments, the first communication network 551 may be a 4G communication network 220, and the second communication network 561 may be a 5G communication network 230.

According to various embodiments, the first communication modem 510 may support the first communication network 551. For example, the first communication modem 510 may be a 4G communication modem. The first communication modem 510 may transmit data obtained from the processor 530 via the first communication network 551 or transfer data obtained via the first communication network 551 to the processor 530. According to various embodiments, the first communication modem 510 may include a communication processor (CP) (not shown).

According to various embodiments, the second communication modem 520 may support the second communication network 561. For example, the second communication modem 520 may be a 5G communication modem. The second communication modem 520 may be the same or similar to the 5G communication modem 203 of FIGS. 2 to 4. The second communication modem 520 may transmit data obtained from the processor 530 via the second communication network 561 or transfer data obtained via the second communication network 561 to the processor 530. According to various embodiments, the second communication modem 520 may include a communication processor (CP) (not shown).

According to an embodiment, when the electronic device 500 operates in the NSA mode, the first communication modem 510 and the second communication modem 520 may operate in a turned-on state. According to another embodiment, when the electronic device 500 operates in the 5G SA mode, the first communication modem 510 may be terminated, and the second communication modem 520 is terminated and then rebooted to operate while remaining in the turned-on state.

According to various embodiments, when the electronic device 500 operates in the NSA mode, the first communication modem 510 and the second communication modem 520 may support interworking therebetween. To that end, the first communication modem 510 and the second communication modem 520 may be connected with each other via a hardware interface 519. For example, the first communication modem 510 and the second communication modem 520 may perform HS-UART communication.

According to various embodiments, when the electronic device 500 operates in the NSA mode, a first control path 511 may be formed between the first communication modem 510 and the second communication modem 520 to transmit/receive control signals. The first communication modem 510 may transmit/receive control data to/from the processor 530 using, e.g., IPC messages. The control data received by the second communication modem 520 from the second base station 560 may be transferred via the first communication modem 510 and the first control path 511 to the processor 530. Meanwhile, the user data received by the first communication modem 510 from the first base station 450 may be directly transferred to the processor 530 via the first communication modem 510 and the first data path 513.

According to various embodiments, the user data received by the second communication modem 520 from the second base station 560 may be directly transferred to the processor 530 via the second data path 517 between the second communication modem 520 and the processor 530 without passing through the first communication modem 510.

According to various embodiments, when the electronic device 500 operates in the 5G SA mode, the first communication modem 510 may be deactivated, and a second control path 515 and a second data path 517 may be formed between the second communication modem 520 and the processor 530.

According to various embodiments, the processor 530 may execute an application and/or operations related to the RIL stored in the memory 550. The processor 530 may determine whether the electronic device 500 operates in the NSA mode or 5G SA mode. According to various embodiments, this determination may be made depending on a predetermined condition, e.g., depending on whether the 5G channel status is good enough to meet a predetermined level or more or whether there is the user's selection. If it is determined to switch from the NSA mode to 5G SA mode, the RIL 212 in the processor 530 (or being executed by the processor 530) may be initialized, and the first communication modem 510 and/or second communication modem 520 may be terminated, and the second communication modem 520 may be rebooted. The processor 530 may establish paths of control data and/or user data between the processor 530 and the second communication modem 520 to be able to operate properly according to the 5G mode. For example, a second control path 515 may be established between the processor 530 and the CP (not shown) in the second communication modem 520. The processor 530 may receive 5G control data via the second communication modem 520 and the second control path 515 from the second base station 550. According to various embodiments, the electronic device 500 may access the 5G network via the second base station 560 using the received control data. The processor 530 may establish a second data path 517 between the processor 530 and the second communication modem 520 to transmit/receive data to/from the 5G network.

According to various embodiments, when the electronic device 500 operates in the NSA mode, the processor 530 may switch data paths as the network switches (e.g., data access switching from the 4G network to 5G network) and may transfer data associated with the application via the data path activated by the switching. The processor 530 may obtain control data (e.g., a switching notification message) generated by the second communication modem 520 through the first communication modem 510 and, in response to the control data, may switch the data path.

According to an embodiment, if the first data path 513 is connected, the processor 530 may transfer application-related data to the first communication modem 510 via the connected first data path 513, the first communication modem 510 may transmit the data to the first base station 550, or the processor 530 may receive the application-associated data received from the first base station 550, via the first communication modem 510 and the first data path 513.

According to an embodiment, if the second data path 517 is connected, the processor 530 may transfer application-related data to the second communication modem 520 via the connected second data path 517, the second communication modem 520 may transmit the data to the second base station 560, or the processor 530 may receive the application-associated data received from the second base station 560, via the second communication modem 520 and the second data path 517.

According to various embodiments, the processor 530 may share at least part of the first data path 513 and the second data path 517.

According to various embodiments, the first communication modem 510 and the processor 530 may be included in the same AP SoC chip, and the second communication modem 520 may be included in a separate SoC chip. As the interface 519 between the first communication modem 510 and the second communication modem 520, the above-described HS-UART, UART, universal serial bus (USB), or other various interfaces may be used.

According to various embodiments, the first communication modem 510 and/or the second communication modem 520 may be included in the same CP SoC. According to various embodiments, the two communication modems in a single chip may be connected with each other via a physical interface 519 for inter-communication modem communication.

According to various embodiments, the first communication modem 510 and/or second communication modem 520 and/or processor 530 may be included in the same AP SoC. According to various embodiments, the two communication modems 510 and 520 in a single chip may be connected with each other via a physical interface 519 for inter-communication modem communication.

According to various embodiments, data transmission between the processor 530 and the modems 510 and 520 may be performed via the memory 550. According to an embodiment, a shared memory interface or peripheral component interconnect express (PCIe) interface may perform data transmission in such a manner that the communication processor (not shown) in the modem may record data in the memory 550, and the processor 530 (e.g., the PCIe driver or shared memory driver in the processor) reads the data.

According to various embodiments, the memory 550 may store the application and/or RIL. The memory 550 may store commands that enable the processor 530 to perform various embodiments disclosed herein.

Figure 6:
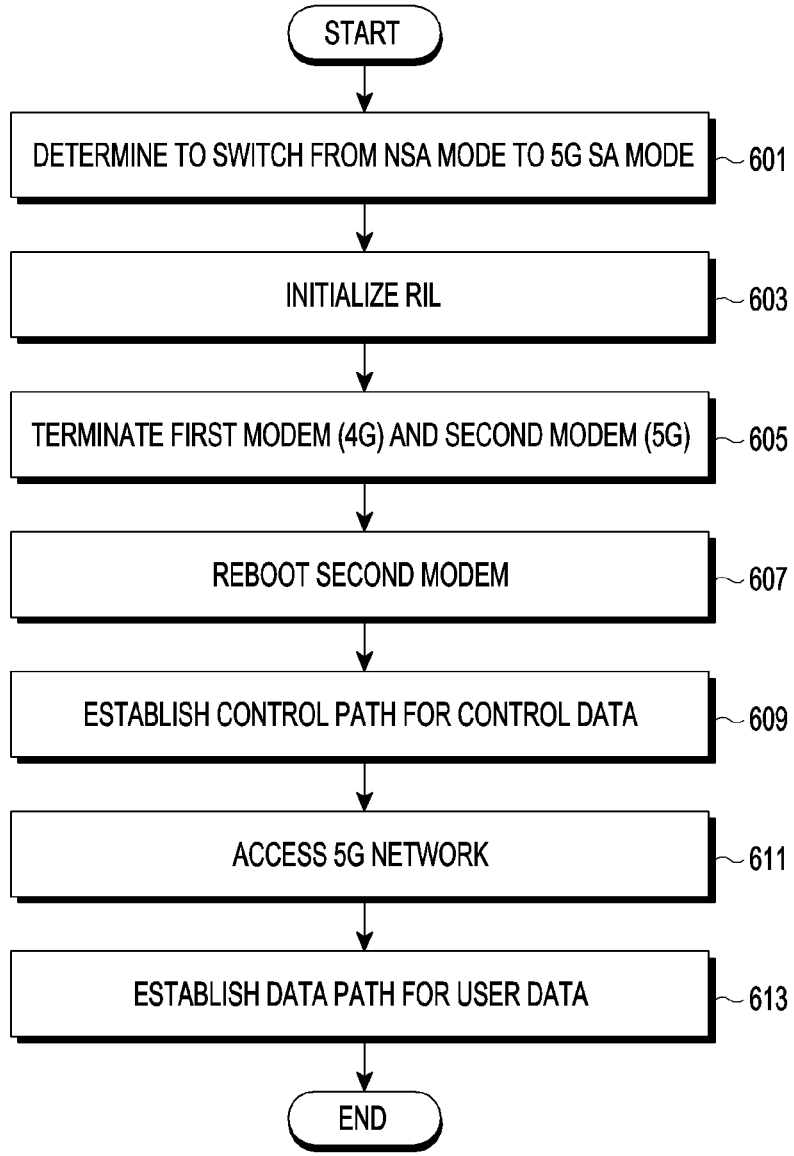
FIG. 6 is a view illustrating operations of an electronic device upon switching from an NSA mode to a 5G SA mode according to various embodiments.

FIG. 6 is a view illustrating operations of an electronic device upon switching from an NSA mode to a 5G SA mode according to various embodiments.

Figure 7:
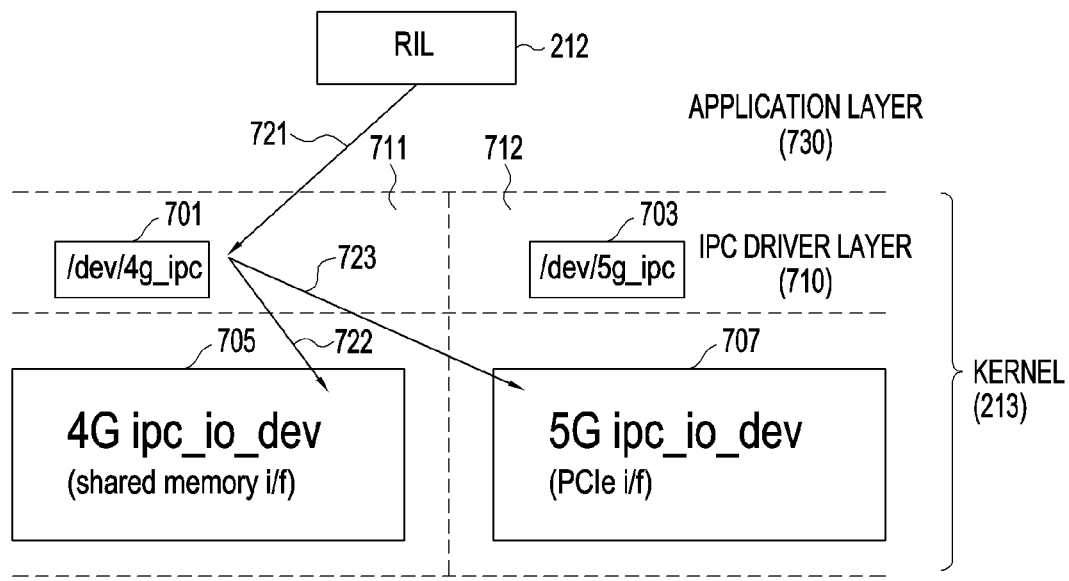
FIG. 7 is a view illustrating operations of a kernel according to various embodiments of the disclosure.

FIG. 7 is a view illustrating operations of a kernel according to various embodiments of the disclosure.

According to various embodiments, an electronic device may be the same or similar to the electronic device 101 of FIG. 1, the electronic device 210 of FIGS. 2 to 4, or the electronic device 500 of FIG. 5, and the operations of FIG. 6 and/or FIG. 7 may be performed by at least one (e.g., the processor 250 or program) of the components of the electronic device 101 of FIG. 1 or the electronic device 210 of FIGS. 2 to 4 or at least one component (e.g., the processor 530) in the electronic device 500 of FIG. 5.

Referring to FIG. 6 and/or FIG. 7, the electronic device may be assumed to operate in the NSA mode.

According to various embodiments, in operation 601, the electronic device may determine to switch from the NSA mode to 5G SA mode. For example, the electronic device may determine to switch to the 5G SA mode depending on whether the 5G channel status is as good as meeting a predetermined level or more or depending on whether there is a user's selection.

In operation 603, the electronic device may initialize the RIL 212 to operate in the 5G SA mode.

For example, upon determining to switch from the NSA mode to, and operate in, the 5G SA mode, the processor may terminate the connection with the network, which is connected in the NSA mode in the RIL 212 currently in operation, and terminate the RIL currently in operation, and then restart the RIL 212. Since the RIL 212 does not separately operate depending on the kind of the network attached, if the RIL 212 currently in operation is restarted, it may be normally operated regardless of the kind of the network reattached after the restart.

According to various embodiments, if the RIL is initialized, the modems may be initialized as well. Specifically, if the RIL is terminated/started, the "communication processor booting daemon (CBD)" being operated on the processor may also be terminated/started, and the communication modems (i.e., the first modem and the second modem) may be loaded/unloaded. Thus, the hardware operation of the communication modems may be terminated/started. The CBD may perform the functions of booting of the communication processor (CP) and CP memory dumping and may stay on the same application layer as the RIL and operate while interacting with the termination/start of the RIL. According to an embodiment, the RIL may directly reboot the modem without using the CBD.

In operation 605, the electronic device may terminate the 4G modem 201 and the 5G modem 203. To switch to the 5G SA mode while operating in the NSA mode, the electronic device may terminate (or turn off) the 4G modem 201 and the 5G modem 203 via a shutdown IPC message of the RIL 212. If the 5G SA mode which is the switched-to operation mode is stored, and then the RIL is restarted, the CBD may also be restarted. Further, if the shutdown IPC message of the RIL 212 is transmitted, the communication processor (CP) is shut down, and the 5G modem may transmit the parameter values stored in the modem to the processor, and the processor may store the parameter values in the memory.

According to various embodiments, the 5G modem may perform different operations depending on the NSA mode and the 5G SA mode.

According to an embodiment, in the NSA mode, the 5G modem 203 may drive the driver (e.g., UART driver or HS-UART driver) corresponding to the inter-modem communication hardware (e.g., UART or HS-UART interface) for communication with the 4G modem 201 and may drive the mode manage controller (MMC) 213 for transmission/reception of information (network connection status or signal strength information) to/from the 4G modem 201. According to an embodiment, the MMC may be configured in a software module. The MMC may transfer IPC information necessary for information transmission/reception to the IPC processor module in the 5G modem.

According to an embodiment, since the 4G modem 201 is turned off in the 5G SA mode, the 5G modem 203 may not perform inter-modem communication, such as HS UART communication, with the 4G modem 201. Thus, the 5G modem 203 may refrain from initializing the driver for inter-modem communication such as HS UART driver and may not drive the MMC 213 either. Instead, the processor or RIL 212 may directly establish an IPC communication channel and may drive a full set of IPC protocol including the whole IPC message in the 5G modem 203.

In operation 607, the electronic device may reboot the terminated second modem to operate in the 5G mode.

The electronic device 210, upon controlling to start the RIL 212 in the 5G SA mode, may terminate the CBD of the 4G modem 201 and start the CBD of the 5G modem 203 to reboot the 5G modem 203. For reference, the 5G modem 203 may read the information of the operation mode stored in the memory upon booting. Here, since the information of the operation mode is the information of the 5G SA mode, the 5G modem may initialize the functions fitting the 5G SA mode. For example, since the 5G MMC 213 is not needed in the 5G SA mode, it does not activate the MMC 213 but may activate the other necessary functions.

In operation 609, the electronic device may establish a control path for control data between the processor and the communication modem. As described above, in the 5G mode, the control path 301 may be formed between the 5G IPC 405 and the RIL 212 (or processor).

According to various embodiments, in the 5G SA mode, the processor and the 5G modem 203 may directly transmit/receive IPC control data via an inter-chip interface such as peripheral component interconnect express (PCIe) interface. To that end, the processor and the 5G modem 203, respectively, may activate the hardware driver and IPC protocol related to transmission/reception of IPC control data. According to various embodiments, the kernel 213 of the processor (or the kernel 213 being operated on the processor) may change the IPC path in the kernel when the operation mode is changed.

Referring to FIG. 7, the RIL 212 of the application layer 730 may access the IPC driver layer 710 of the kernel 213 using Linux-based files. According to various embodiments, the IPC driver layer 710 may include the function of switching IPC paths. In FIG. 7, reference number 701 may denote a file (4G IPC file) for accessing the 4G IPC driver layer 711, and reference number 703 in FIG. 7 may denote a file (5G IPC file) for accessing the 5G IPC driver 712.

According to various embodiments, the RIL 212 may access the 4G IPC driver layer 711 using the 4G IPC file 701 (721). In this case, the 4G IPC driver layer 711 may form an IPC path to one of the IPC 10 devices 705 and 707 corresponding to the current operation mode of the electronic device.

According to an embodiment, the RIL 212 may access the 4G IPC driver layer 711 using the 4G IPC file 701 (721). If the electronic device operates in the NSA mode, the 4G IPC driver layer 711 may establish an IPC path between the RIL 212 and the 4G IPC IO device 705 which is the IPC IO device corresponding to the current operation mode of the electronic device (722).

According to an embodiment, the RIL 212 may access the 4G IPC driver layer 711 using the 4G IPC file 701 (721). If the electronic device switches to the 5G SA mode while operating in the NSA mode, the 4G IPC driver layer 711 may establish an IPC path between the RIL 212 and the 5G IPC IO device 707 which is the IPC IO device corresponding to the switched-to operation mode of the electronic device (723). In other words, even when in the 5G SA mode, the RIL 212 accesses the kernel 212 via the 4G IPC file path, the kernel 213 may connect the RIL 212 to the 5G IPC 405.

According to an embodiment, the kernel 213 itself may perform the function of switching IPC paths depending on the operation mode of the electronic device. In this case, the kernel 213 may have no separate function of switching IPC paths.

Referring back to FIG. 6, in operation 611, the electronic device may access the 5G network via the established control path. That is, the initialized RIL 212 may transfer IPC messages corresponding to such commands as, e.g., "discovery," "attach," and "PDN connection setup," of the 5G network to the 5G modem 203 via the established control path, and the 5G modem 203 may perform the operation for attaching to the 5G network based on the IPC messages, thereby attaching to the 5G network.

In operation 613, the electronic device may reestablish a data path for transmission/reception of user data.

According to an embodiment, if the electronic device operates in the 5G SA mode, the RIL 212 may be initialized, and the RMNET configuration (not shown) which has previously connected to the RIL 212 may be deleted, and the newly initialized RIL 212 may again perform the RMNET configuration for packet data connection with the 5G modem 203. According to various embodiments, the RMNET is a virtual network configured for a network device, e.g., TCP/IP, to access, and may play a role as a connection path for TCP/IP packets.

Figure 8:
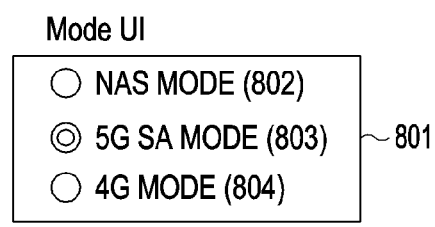
FIG. 8 is a view illustrating an example user interface (UI) for switching operation modes of an electronic device according to various embodiments.

FIG. 8 is a view illustrating an example user interface (UI) for switching operation modes of an electronic device according to various embodiments.

Referring to FIG. 8, according to an embodiment, a mode selection UI may be displayed (801) to the user. According to an embodiment, operation modes of the electronic device may include an NSA mode 802, a 5G SA mode 803, and a 4G mode 804. However, this is merely an example, and the operation modes may be not limited thereto.

According to an embodiment, the user may select one of the NSA mode 802, the 5G SA mode 803, and the 4G mode 804. FIG. 8 illustrates an example in which the 5G SA mode 803 is selected.

According to an embodiment, a mode switching may be performed automatically, rather than by the user's selection. For example, if the channel quality of the 5G network remains a reference value or less for a predetermined time while operating in the NSA mode, a switching to the 5G SA mode may be automatically performed. Or, if the channel quality of the 4G network is a reference value or less for a predetermined time while operating in the NSA mode, an automated switching to the 5G SA mode may occur. As such, various conditions may be set up considering, e.g., the kind of network, channel quality values, and/or time.

The embodiments set forth above may be applied also when the electronic device 210 hands over between an SA network and an NSA network. For example, if the electronic device 210 operating in the NSA mode over an NSA network moves and hands over to an SA network and thus switches to the 5G SA mode, the operations according to the above-described various embodiments may be performed, deactivating the modem unnecessary for the operations and unnecessary functions in the modem necessary for the operations. Further, a data path and a control path may be reestablished between the RIL (or processor) and the modems.

The invention claimed is:

1. An electronic device, comprising:
a first modem configured to provide first wireless communication in a first frequency band;
a second modem configured to provide second wireless communication in a second frequency band higher than the first frequency band and exchange control information with the first modem;

a processor operatively connected with the first modem and the second modem; and a memory operatively connected with the processor, wherein the memory stores instructions configured to, when executed, cause the processor to:

in a first operation:
provide a radio interface layer (RIL) configured to establish a first data path with the first modem and a second data path with the second modem,
control the RIL to directly exchange a first control signal associated with the first modem with the first modem, and
control the RIL to exchange a second control signal associated with the second modem with the second modem, via the first modem; and in a second operation,
control the RIL to establish the second data path with the second modem but not the first data path with the first modem, and
control the RIL to directly exchange the second control signal associated with the second modem with the second modem.

2. The electronic device of claim 1, wherein the first frequency band is selected from between 500 MHz to 3,000 MHz, and
the second frequency band is selected from 20 GHz or more.

3. The electronic device of claim 1, wherein the first modem includes a first inter-process communication (IPC) interface configured to interface with the RIL, and
the second modem includes a second IPC configured to interface with the RIL.

4. The electronic device of claim 1, wherein the instructions are further configured to, when executed, cause the processor to control the second modem to exchange control information with the first modem in the first operation.

5. The electronic device of claim 1, wherein the first modem is connected with the second modem using a hardware interface,
wherein the hardware interface includes at least one of a universal asynchronous receiver/transmitter (UART), high speed UART (HS-UART), inter-integrated circuit (I2C), or serial peripheral interface bus (SPI), and
wherein the instructions are further configured to, when executed, cause the processor to exchange the control information via the hardware interface in the first operation.

6. The electronic device of claim 1, wherein the second modem is configured to determine to use a network supporting the second frequency band and provide a control signal associated with the determination to the RIL via the first modem in the first operation, and
wherein the second modem is configured not to make the determination in the second operation.

7. The electronic device of claim 1, wherein the control information includes at least one of a radio resource control (RRC) status, a switching message, an inter-process communication (IPC), or RSSI information.

8. A method of communication by an electronic device including a processor, a first modem for a first communication network and a second modem for a second communication network, the method comprising:
in an interworking mode in which the second modem and the first modem interwork to communicate with the second communication network, providing a radio interface layer (RIL) of the processor configured to establish a first data path with the first modem and a second data path with the second modem, exchanging a first control signal associated with the first modem with the first modem directly by RIL, and exchanging a second control signal associated with the second modem with the second modem, via the first modem by RIL;

switching from the interworking mode to a second modem-dedicated mode for communication with the second communication network without interworking with the first modem;

initializing the radio interface layer (RIL) of the processor, turning off the first modem, and rebooting the second modem; and in the second modem-dedicated mode, providing the RIL configured to establish the second data path with the rebooted second modem but not the first data path with the first modem, and exchanging the second control signal associated with the second modem with the second modem directly by RIL, wherein the first modem is configured to provide first wireless communication in a first frequency band, and wherein a second modem is configured to provide second wireless communication in a second frequency band higher than the first frequency band and exchange control information with the first modem.

9. The method of claim 8, wherein the providing of the RIL configured to establish the second data path with the rebooted second modem includes:
configuring a control path for control data related to the second communication network between the rebooted second modem and the RIL of the processor;
accessing the second communication network using the configured control path; and
establishing a user data path for user data between the rebooted second modem and the RIL of the processor.

10. The method of claim 8, wherein the rebooting of the second modem comprises deactivating at least one function for interworking with the first modem in the second modem, and
wherein the first communication network is a 4G communication network, and the second communication network is a 5G communication network.

11. An electronic device, comprising:
a first modem for communication with a first communication network;
a second modem for communication with a second communication network; and
at least one processor operatively connected with the first modem and the second modem,
wherein the at least one processor is configured to:
in an interworking mode in which the second modem and the first modem interwork to communicate with the second communication network, provide a radio interface layer (RIL) of the processor configured to establish a first data path with the first modem and a second data path with the second modem, exchange a first control signal associated with the first modem with the first modem directly by RIL, and exchange a second control signal associated with the second modem with the second modem, via the first modem by RIL, switch from the interworking mode to a second modem-dedicated mode to communicate with the second communication network without interworking with the first modem, initialize the radio interface layer (RIL) of the at least one processor, turn off the first modem, reboot the second modem, and in the second modem-dedicated mode, provide the RIL configured to establish the second data path with the rebooted second modem but not the first data path with the first modem, and exchange the second control signal associated with the second modem with the second modem directly by RIL, wherein the first modem is configured to provide first wireless communication in a first frequency band, and wherein a second modem is configured to provide second wireless communication in a second frequency band higher than the first frequency band and exchange control information with the first modem.

12. The electronic device of claim 11, wherein the processor is configured to, upon providing the RIL configured to establish the second data path with the rebooted second modem:
configure a control path for control data related to the second communication network between the rebooted second modem and the RIL of the processor,
control the second modem to access the second communication network using the configured control path, and
configure a user data path for user data between the rebooted second modem and the RIL of the processor.

13. The electronic device of claim 11, wherein the processor is configured to, upon rebooting the second modem, deactivate at least one function for interworking with the first modem in the second modem, and wherein the first communication network is a 4G communication network, and the second communication network is a 5G communication network.

* * * * *